March 24, 1964 A. E. LEININGER 3,125,777
WINDSHIELD WIPER MECHANISM
Filed Dec. 22, 1961 3 Sheets-Sheet 2

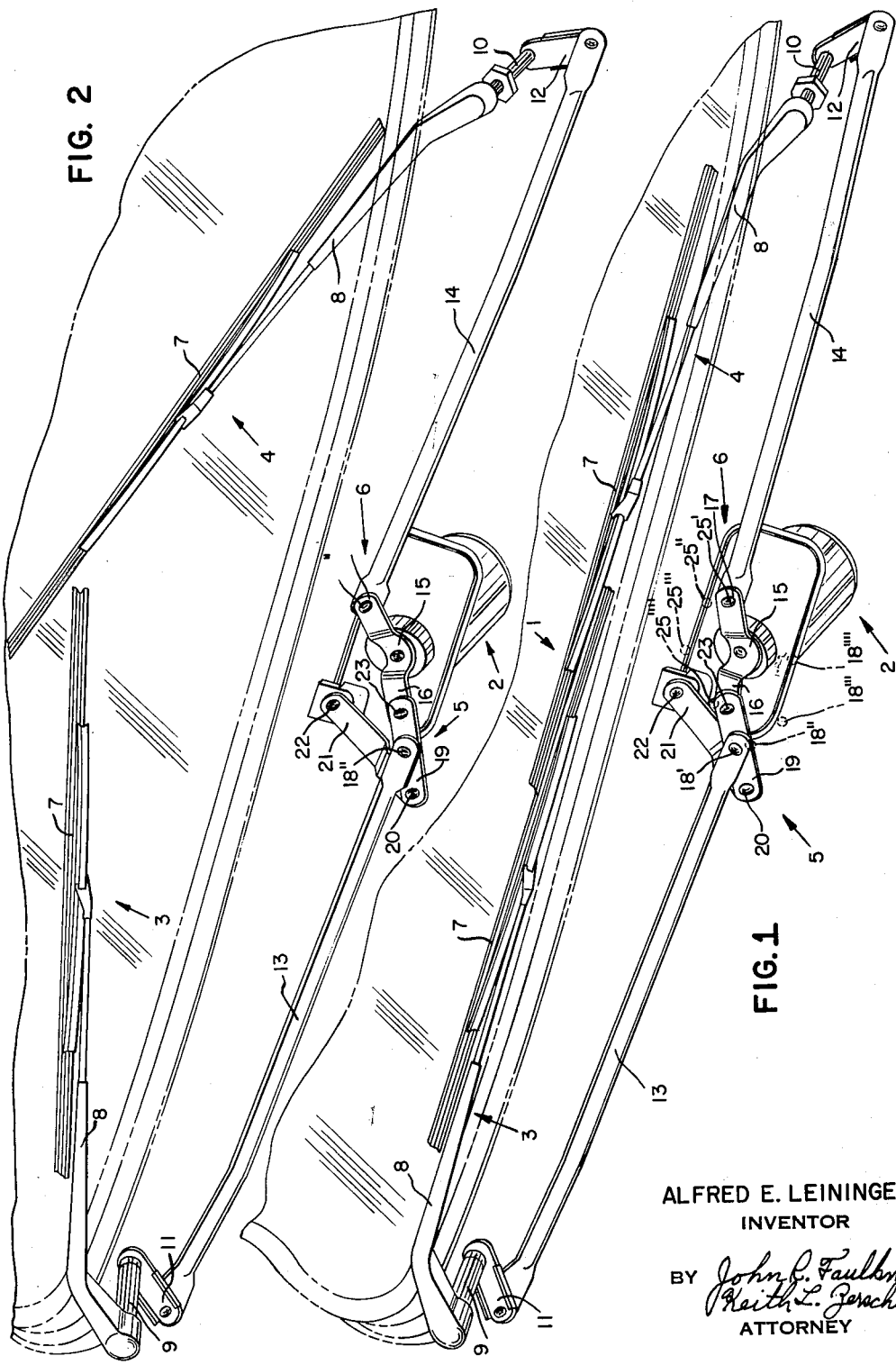

ALFRED E. LEININGER
INVENTOR

BY John R. Faulkner
Keith L. Gerschling
ATTORNEY

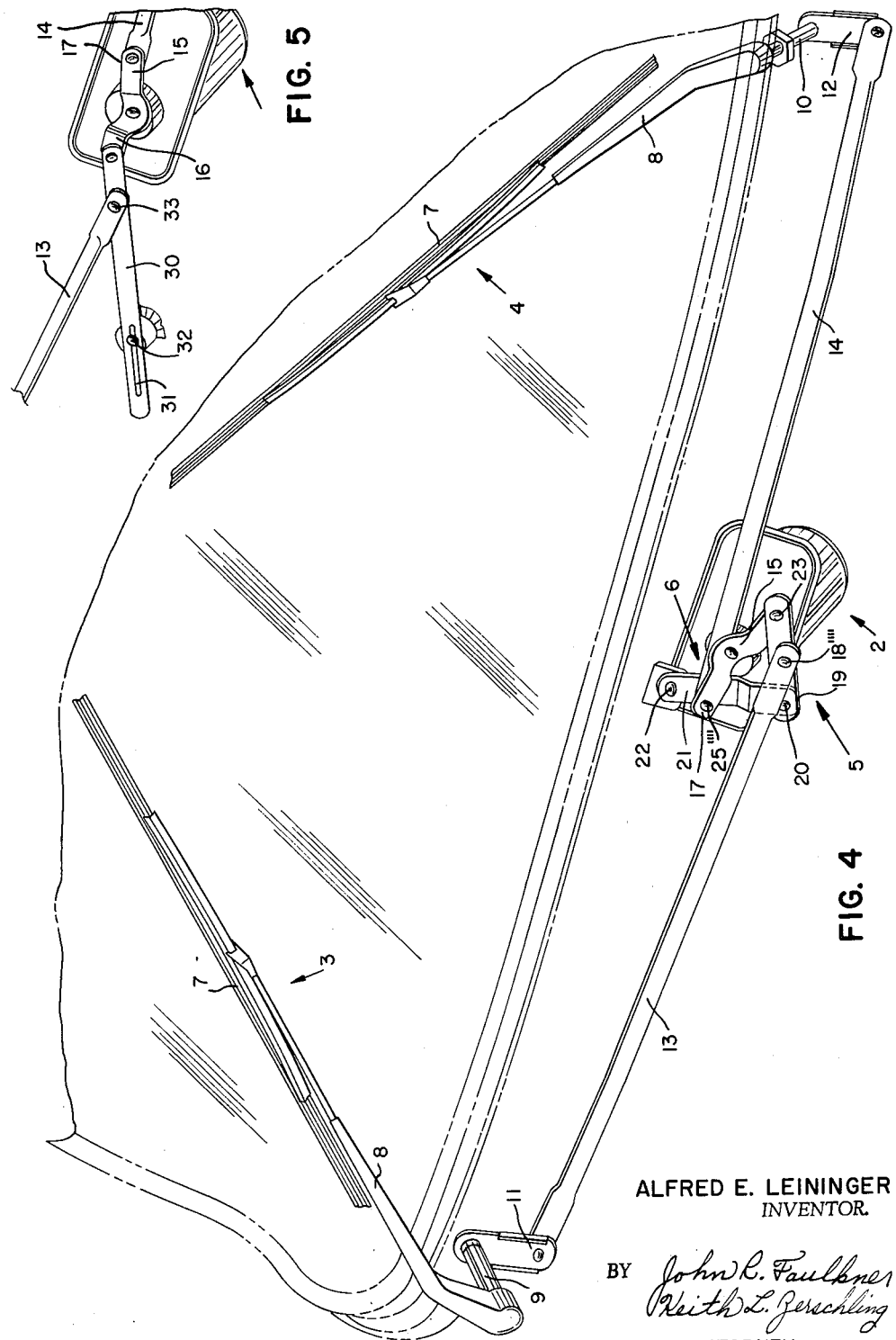

United States Patent Office 3,125,777
Patented Mar. 24, 1964

3,125,777
WINDSHIELD WIPER MECHANISM
Alfred E. Leininger, Ypsilanti, Mich., assignor to Ford Motor Company, Dearborn, Mich., a corporation of Delaware
Filed Dec. 22, 1961, Ser. No. 161,479
7 Claims. (Cl. 15—250.14)

This invention relates to window cleaning devices and, in particular, relates to a novel and improved cleaning device for the windshield of an automotive vehicle.

The windshield wiper, which is the subject of this invention, utilizes two pivoted wiper means, each having a wiper blade. The wiper blades are in an overlapping relationship when the wiper means are at the center of the windshield adjacent to the automobile body. The two wiper means are connected to a linkage means comprising two linkages. One of the linkages is a simple four-bar linkage which drives one of the wiper means at a first acceleration. The other linkage is an idler linkage or a variable acceleration linkage which drives the associated wiper means at a second acceleration which is different than the first acceleration. Both linkages are connected to a motor having a reciprocating action. The motor actuates the linkages so that the overlapping wiper blades will freely traverse the windshield.

It is the general object of this invention to provide an improved window wiper.

Another object of the invention is the provision of a window wiper that will clean a large area of an automobile windshield.

Another object of the invention is the provision of a window wiper that will clean a continuous area across the greater part of an automobile windshield.

Other objects and advantages will become apparent when reference is made to the following detailed description and the accompanying drawings, wherein:

FIGURE 1 is a front view of the automobile windshield and wiper means wherein a portion of the automobile body has been removed so that the linkage arrangement of the windshield wiper is visible;

FIGURE 2 is a view similar to FIGURE 1 showing the windshield wiper after approximately one-third of the wiper traverse has elapsed;

FIGURE 4 is a view similar to FIGURE 1 showing the windshield wiper approaching the completion of the wiper traverse; and, FIGURE 5 is a front view of an alternative linkage for driving the wiper means of the windshield wiper.

Figure 3:
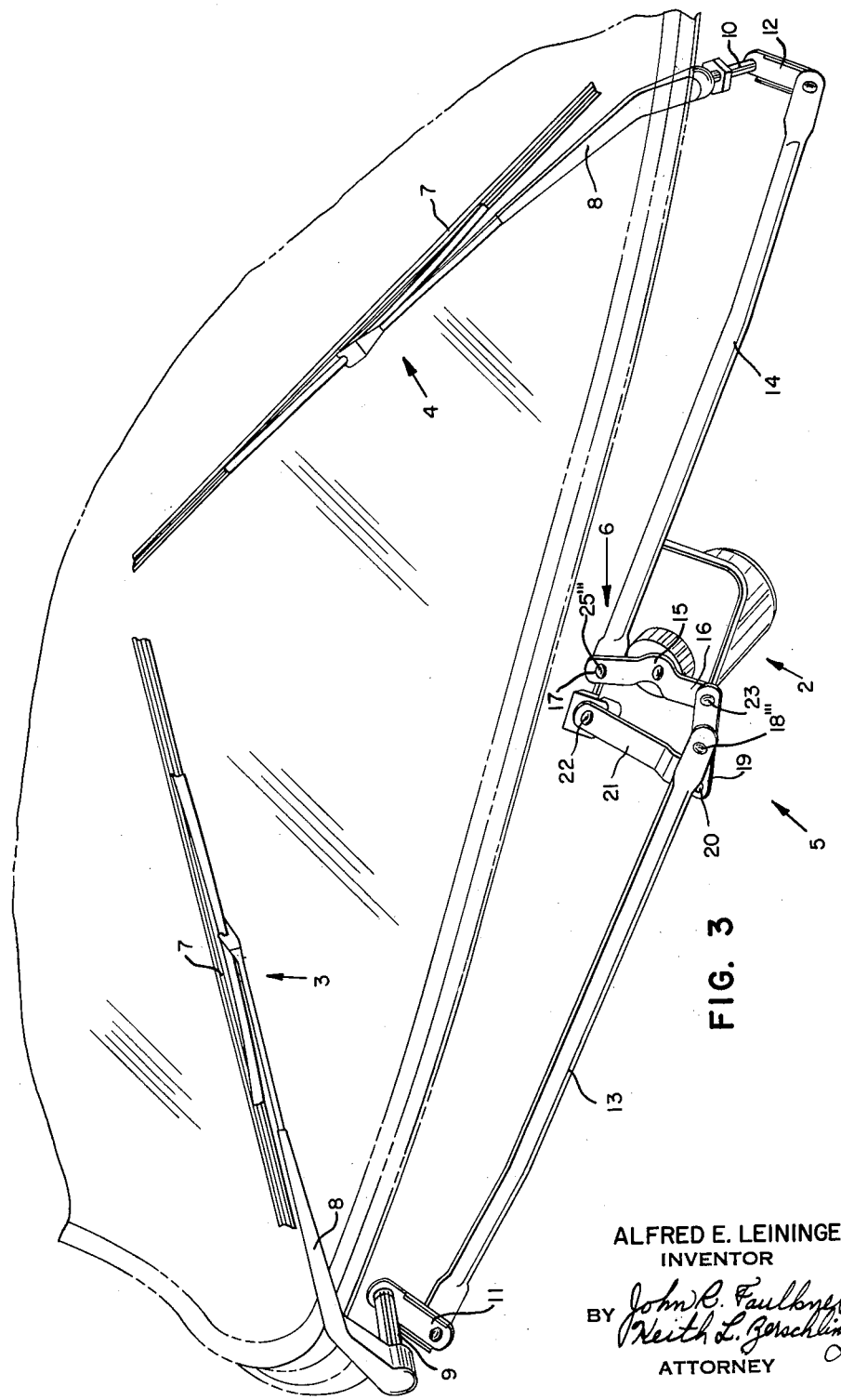
FIGURE 3 is a view similar to FIGURE 1 showing the windshield wiper after approximately two-thirds of the wiper traverse has elapsed.

A windshield wiper 1 has the wiper means 3 and 4 which are operated by a linkage means comprising linkages 5 and 6. This linkage means is connected to a centrally located driving means 2. The driving means 2 may include an electric or vacuum-operated reciprocating motor. The wiper means 3 and 4 comprise wiper blades 7 pivotally attached in the usual way to wiper arms 8. It should be noted that the wiper blades are in an overlapping relationship. The wiper arms 8 are rigidly mounted on the shafts 9 and 10. The shafts 9 and 10 are free to rotate but fixed against axial movement.

The United States Patents 2,994,900 and 2,997,727 describe in detail the construction of two alternative wiper means. The particular wiper means described in these patents could be utilized satisfactorily in the preferred embodiment.

The linkage means, comprising the linkages 5 and 6, has the arms 11 and 12 rigidly attached to the shafts 9 and 10, respectively. The reciprocal links 13 and 14 are pivotally attached in a conventional manner to the arms 11 and 12, respectively. The reciprocal link 14 is attached directly to the rocker link 15 which is rigidly mounted on the shaft of the driving means 2. The rocker link 15 has two rocker arms 16 and 17. The arms 16 and 17 are different in length, and the intersection of their longitudinal axis makes an acute angle.

The reciprocal link 13 is pivotally attached at the pivot point 18 to a first idler link or variable acceleration link 19. The first variable acceleration link 19 is pivotally attached at the pivot point 20 to a second idler link or variable acceleration link 21. The second variable acceleration link 21 is pivotally attached at pivot point 22 to the body of the automobile. The first variable acceleration link 19 is pivotally attached at pivot point 23 to the rocker arm 16.

The rocker arm 17, reciprocal link 14 and the arm 12 comprise a linkage or more particularly a four-bar linkage 6 which drives the wiper means 4. The rocker arm 16, first variable acceleration link 19, the second variable acceleration link 21, the reciprocal link 13 and the arm 11 comprise a variable acceleration linkage or idler linkage 5. This linkage will drive the attached wiper means 3 at an acceleration different from the acceleration caused by the four-bar linkage 6 connected to the wiper means 4.

FIGURE 1 shows the windshield wiper and its associated linkages at the zero position of the wiper traverse. The wiper traverse is defined as the total angle of travel experienced by the wiper blade in moving from the center of the windshield adjacent the automobile body to the outer extremity of the windshield. For the purpose of this description, a smaller traverse than is usual is considered. It should be noted that the windshield wiper blades are in an overlapping relationship when in the zero position of the wiper traverse.

Referring to FIGURE 2, when the windshield wiper is turned on by the operator of the automotive vehicle, the rocker arm 17 will drive the reciprocal link 14, arm 12 and the wiper means 4 at an acceleration which initially exceeds the acceleration that the variable acceleration linkage 11, 13, 16, 19 and 21 transmits to the wiper means 4. FIGURE 2 shows the position of the windshield wiper means and the associated linkages after approximately one-third of the wiper traverse has been completed. It should be noted that during the first one-third of the traverse, the four-bar linkage 12, 14 and 17 causes a greater acceleration than the variable acceleration linkage 11, 13, 16, 19 and 21; this results in the wiper means 4 initially experiencing a greater total displacement than the wiper means 3.

FIGURE 3 shows the windshield wiper means and the associated linkages after approximately two-thirds of the wiper traverse has been completed. At this point, the wiper means 4, which is attached to the four-bar linkage 12, 14 and 17, has begun to decelerate relative to the wiper means 3 driven by the variable acceleration linkages 11, 13, 16, 19 and 21. The wiper means 3 lags slightly behind the wiper means 4.

FIGURE 4 shows a windshield wiper and its associated linkage approaching the completion of the wiper traverse. It should be noted that the wiper blades reach the extremity of the traverse at approximately the same instant. Under ordinary circumstances the extremity of the traverse would approach the extremity of the windshield.

After the completion of the wiper traverse the wiper means 3 and 4 will return from the outer extremities of the windshield to the central portion of the windshield adjacent the automobile body. The mode of operation during the return of the wiper means 3 and 4 is essentially the reverse of the above-described wiper traverse. The wiper means 3, driven by the variable acceleration linkage 11, 13, 16, 19 and 21, will initially experience a high acceleration relative to the wiper means 4, driven by the four-bar linkage 12, 14 and 17. During the final portion of the return traverse, the wiper means 3 will decelerate relative to the deceleration of the wiper means 4. The wiper means 3, attached to the variable acceleration linkage, and the wiper means 4, attached to the four-bar linkage, will arrive at their center position at approximately the same instant.

In moving to the extremity of a wiper traverse and returning, the pivot point 18' moves along an approximately elliptical path 18'', 18''', 18'''' (FIGURE 1), while the pivotal connection 25' moves along a circular path 25'', 25''', 25''''. It should be noted that when the rocker link 15 is at a zero position (FIGURE 1) the pivot point 18' is in the vicinity of the apex of the elliptical path. When the pivot point 18' is in the vicinity of the apex, each degree of rotation of the rocker link 15 will cause a large vertical displacement and a relatively small horizontal displacement of the pivot point 18'. The vertical displacement of the pivot point 18' tends to cause the reciprocal link 13 to experience a rotational displacement. The first and second variable acceleration links 19 and 21, therefore, initially transmit a slight horizontal displacement and a relatively large angular displacement through the pivot point 18' to the reciprocal link 13 per degree of rocker link rotation. As the pivotal point 18' is moved away from the apex of the elliptical path, the variable acceleration links 19 and 21 will transmit a greater horizontal displacement and a smaller angular displacement to the reciprocal link 13 per degree of rocker link rotation.

In comparison to the variable acceleration links 19 and 21, the pivotal connection 25', which moves in a circular path, transmits to the reciprocal link 14 a more constant horizontal and angular displacement per degree of rotation of the rocker link 15. During the first portion of the wiper traverse the pivotal connection 25' transmits a greater horizontal displacement to the reciprocal link 14 than the pivotal connection 18' transmits to the reciprocal link 13, while during later portions of the wiper traverse the converse is true.

The horizontal displacement transmitted to the reciprocal links 13 and 14 per degree of rocker link rotation will, in part, determine the acceleration transmitted to the arms 11 and 12. The proportioning of the links 11 to 19 and the angular relationship of these links will determine the exact nature of the acceleration transmitted from the driving means 2 to the arms 11 and 12.

From the foregoing discussion, it is apparent that if the pivotal connection 18' is at the apex of the elliptical path when the rocker link 15 (FIGURE 1) is in a zero position, the arm 11 will virtually experience a dwell period before beginning to rotate. This is caused by the reciprocal link initially experiencing very little, if any, horizontal displacement.

It is within the scope of the invention to provide a linkage such as the variable acceleration linkage, shown in FIGURE 1, or more particularly to provide a variable acceleration linkage which will virtually experience an initial dwell period and then be driven at a higher acceleration than the four-bar linkage.

FIGURE 5 shows such an alternative linkage for driving the wiper means 3. The rocker arm 16 in this embodiment is pivotally attached to a slider link 30. The slider link 30 is slidably and rotatably mounted on the automobile body by the slot 31 and the pin 32 which is rigidly attached to the automobile body. The slider link 30 is pivotally attached to the reciprocal link 13 at the pivotal point 33.

The slider link 30 enables the rocker arm 16 to drive the reciprocal link 14 in an elliptical path similar to that described in regards to the embodiment shown in FIGURE 1. Following the initially slow acceleration or dwell the reciprocal link 13 will be accelerated so that the wiper means 3, driven by the reciprocal link 13, will arrive at the extremity of the windshield at approximately the same instant as the wiper means 4, driven by the reciprocal link 14. It should be noted that this embodiment accomplishes essentially the same result as the embodiment shown in FIGURE 1 with fewer links.

It should be obvious from the foregoing detailed description that the different acceleration of the two linkages enables the wiper means to utilize overlapping wiper blades. The provision of overlapping wiper blades enables the windshield wiper to clean a larger area of the windshield and to clean a large continuous area across the windshield. The foregoing results are accomplished without sacrificing the advantages incident to a windshield wiper having its wiper blades at rest in the center position of the windshield adjacent to the automobile body.

It should be understood that the invention is not to be limited to the exact construction shown and described. Various changes and modifications of the linkages and the nature of the acceleration imparted by these linkages may be made without departing from the spirit and scope of the invention, as defined by the appended claims.

I claim:

1. In an automobile windshield wiper, the combination of at least two wiper means having overlapping blade portions, said wiper means attached to be moved over the windshield to clean areas thereof, at least two shafts having said wiper means attached thereto, a linkage means connected to said shafts, a motor having a driving shaft connected to said linkage means for driving said linkage means, said linkage means including a four-bar linkage to drive one of said wiper means and a variable acceleration linkage to drive said other wiper means, said four-bar linkage having a rocker link which is directly connected to said driving shaft, a first reciprocal link connected to said rocker link and a driven arm connected to one of said shafts and said reciprocal link, said variable acceleration linkage having a second rocker link connected directly to said driving shaft of said motor, a first variable acceleration link connected to said second rocker link, a second reciprocal link connected to said variable acceleration link and a second driven arm connected to said second reciprocal link and another of said shafts.

2. In an automobile windshield wiper, the combination of at least two wiper means having overlapping blade portions, said wiper means attached to be moved over the windshield to clean areas thereof, at least two shafts having said wiper means attached thereto, a linkage means connected to said shafts, a motor having a driving shaft connected to said linkage means for driving said linkage means, said motor having a reciprocating movement, said linkage means comprising a four-bar linkage to drive one of said wiper means and a variable acceleration linkage to drive said other wiper means, said four-bar linkage having a first rocker link which is directly connected to said driving shaft, a first reciprocal link connected to said first rocker link and a driven arm connected to one of said shafts and said reciprocal link, said variable acceleration linkage having a second rocker link connected directly to said driving shaft of said motor, a first variable acceleration link connected to said second rocker link, a second reciprocal link connected to said variable acceleration link and a second driven arm connected to said second reciprocal link and another of said shafts.

3. In a windshield wiper, the combination of at least two pivoted wiper means attached to be moved over the windshield to clean areas thereof, a first reciprocal link means for driving one of said wiper means, said first reciprocal link means connected to said wiper means, a second reciprocal link means for driving a second wiper means, said second reciprocal link means connected to said second wiper means, a driving means for driving said first and second reciprocal link means, said driving means connected to said first and second reciprocal link means, said driving means comprising, a motor having a reciprocating action, a means for driving one end of said first reciprocal link means in an elliptical path, said means attached to said first reciprocal link means and to said motor, and a means for driving one end of said second reciprocal link means in a circular path, said means attached to second reciprocal link means and to said motor.

4. In a windshield wiper, the combination of at least two pivoted wiper means attached to be moved over the windshield to clean areas thereof, said wiper means having overlapping blade portions, a first reciprocal link means for driving a first wiper means, said first reciprocal link means connected to said first wiper means, a second reciprocal link means for driving a second wiper means, said second reciprocal link means connected to said second wiper means, a driving means for driving said first and second reciprocal link means, said driving means comprising, a motor having a reciprocating action, a first means for driving one end of said first reciprocal link means in an elliptical path, said means attached to said first reciprocal link means and to said motor, a second means for driving one end of said second reciprocal link means in a circular path, said means attached to said second reciprocal link means and to said motor, whereby said first and second reciprocal link means drive said first and second wiper means so that the overlapping blade portions do not interfere.

5. The structure defined by claim 2 wherein said motor is placed between said two shafts.

6. The structure defined by claim 2 wherein said first variable acceleration link has one end slidably mounted on a portion of the automobile body structure and the other end connected to said second rocker link and said reciprocal link is connected to said variable acceleration link between the ends of said variable acceleration link.

7. The structure defined by claim 2 wherein a second variable acceleration link is connected to one end of said first variable acceleration link and mounted on a portion of the automobile body structure, and said reciprocal link is connected between the ends of said first variable acceleration link.

References Cited in the file of this patent

UNITED STATES PATENTS

| | | |
|---|---|---|
| 2,059,354 | Hueber et al. | Nov. 3, 1936 |
| 2,976,555 | Bartoo | Mar. 28, 1961 |

FOREIGN PATENTS

| | | |
|---|---|---|
| 853,835 | Great Britain | Nov. 9, 1960 |
| 856,338 | Great Britain | Dec. 14, 1960 |